C. M. FUNK.
PEDAL CRANK.
APPLICATION FILED OCT. 31, 1917.
1,278,904.
Patented Sept. 17, 1918.
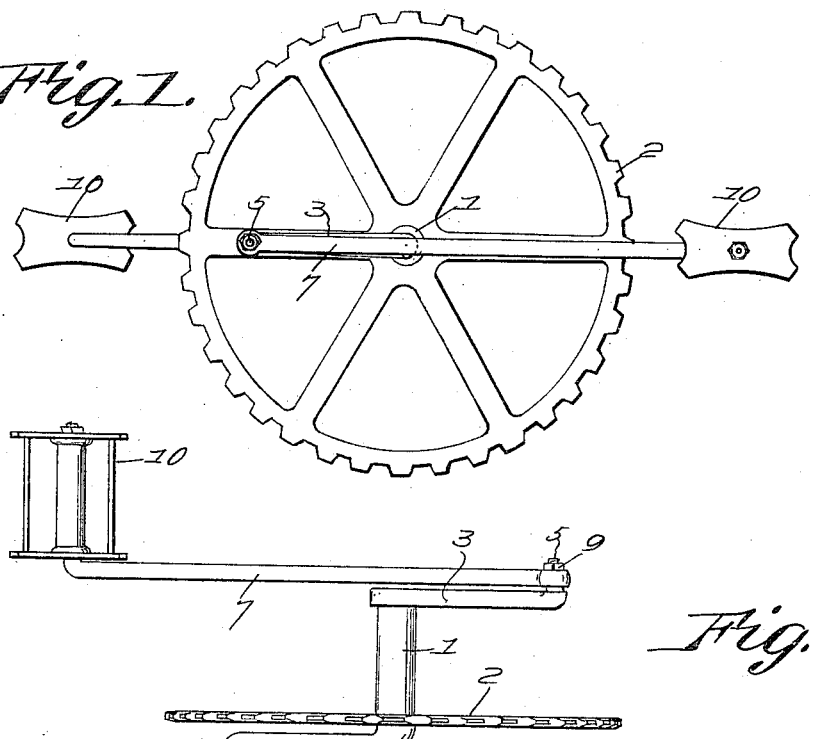
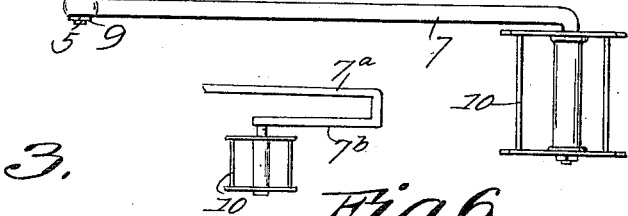
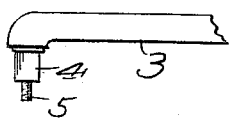
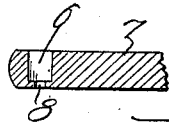
Inventor
Charles M. Funk,
By James J. Heely Co.,
Attorneys

UNITED STATES PATENT OFFICE.

CHARLES M. FUNK, OF SEDALIA, MISSOURI, ASSIGNOR OF ONE-HALF TO GRACE FUNK MYERS, OF HILLSDALE, MICHIGAN.

PEDAL-CRANK.

1,278,904.     Specification of Letters Patent.     Patented Sept. 17, 1918.

Application filed October 31, 1917. Serial No. 199,505.

*To all whom it may concern:*

Be it known that I, CHARLES M. FUNK, a citizen of the United States, residing at Sedalia, in the county of Pettis and State of Missouri, have invented new and useful Improvements in Pedal-Cranks, of which the following is a specification.

My present invention pertains to pedal cranks for the propulsion of bicycles and other velocipedes; and it contemplates the provision of a pedal crank construction adapted to afford increased leverage and driving power notwithstanding the reach of the rider is the same as when an ordinary pedal crank is employed.

The invention also contemplates the provision of a pedal crank construction having on its long lever members return bends or rearwardly directed portions whereby the length of said members is increased as is the leverage afforded so that the construction is well adapted for the driving of a thirty inch wheel.

Other objects and advantageous features of the invention will be fully understood from the following description and claims when the same are read in connection with the drawings accompanying and forming part of this specification, in which:

Figure 1 is a side elevation illustrative of one embodiment of my invention.

Fig. 2 is a plan of the same.

Fig. 3 is a detail of one of the ordinary cranks adapted for incorporation in my novel crank construction.

Fig. 4 is a side elevation of the same.

Fig. 5 is a detail section of the inner portion of one of the long lever members.

Fig. 6 is a detail view of one modified long lever member provided with the return bend or rearwardly directed outer portion hereinbefore alluded to.

Referring by numeral to the said drawings and more particularly to Figs. 1 to 5 thereof:

1 is a crank shaft of a bicycle which is equipped in the ordinary or any other approved manner with a sprocket gear 2 and oppositely-disposed cranks 3 of the usual length. These cranks in furtherance of my invention are provided at their outer portions with laterally-disposed projections 4, of angular form in cross-section, which merge into reduced and threaded portions 5. The projections 4 are adapted to occupy the correspondingly shaped recesses 6 in the inner sides of the inner end portions of the long lever members 7 while the threaded portions 5 extend through apertures 8 in said members 7 and receive nuts 9 through the medium of which the lever members are fastened in fixed relation on the cranks. It will be readily observed by comparison of Figs. 1 and 2 that the long lever members 7 are arranged in parallel relation to the cranks 3, and that said members 7 extend from their points of connection throughout the length of the cranks 3 and considerably beyond the inner ends of the cranks 3 which inner ends are coincident with the ends of the shaft 1. At or adjacent to their free ends the lever members 7 are provided with pedals 10 which are preferably disposed laterally to the lever members as shown and may be of the conventional or of any other approved construction.

It will be manifest from the foregoing that by virtue of the long lever members being arranged as illustrated and described in fixed relation to the cranks 3 the leverage afforded the rider of a bicycle is increased to a material extent without increasing the reach and without rendering the pedal crank construction unsightly in appearance or cumbersome.

In Fig. 6 I show a long lever member 7ª having a return bend or rearwardly directed portion 7ᵇ on which the pedal 10 is carried. This type of lever member renders it feasible to employ a very long lever member or members in a crank construction designed for the rotation of a thirty inch ground wheel, while placing the pedals within easy reach of the rider's feet.

Having described my invention, what I claim and desire to secure by Letters Patent, is:

1. The combination with the crank shaft of a velocipede and oppositely disposed cranks thereon, said cranks having near their free ends outwardly-directed lateral projections of angular form in cross section and reduced and threaded portions which extend from said projections; of long lever members arranged in parallel relation to the cranks and having recesses in their inner sides adjacent to their inner ends receiving the said crank projections, whereby the lever members are fixed to the cranks, and also having apertures for the reception of the threaded portions of the cranks, said lever members extending from said points of connection considerably beyond the points at which the cranks are joined to their shaft and being equipped on their extended portions with pedals, and nuts mounted on the said threaded portions of the cranks and securing the lever members on the cranks.

2. In a crank construction, the combination with the crank shaft of a velocipede and oppositely-disposed cranks thereon; of long lever members arranged in parallel relation to the cranks and fixed at their inner ends to the outer ends of the cranks, said lever members extending from said points of connection toward and past and considerably beyond the points at which the cranks are joined to their shaft and being equipped on their extended portions with pedals.

In testimony whereof I have hereunto set my hand in presence of two subscribing witnesses.

CHARLES M. FUNK.

Witnesses:
W. H. VAN WAGONER,
J. L. VAN WAGONER.

Copies of this patent may be obtained for five cents each, by addressing the "Commissioner of Patents. Washington, D. C."